UNITED STATES PATENT OFFICE.

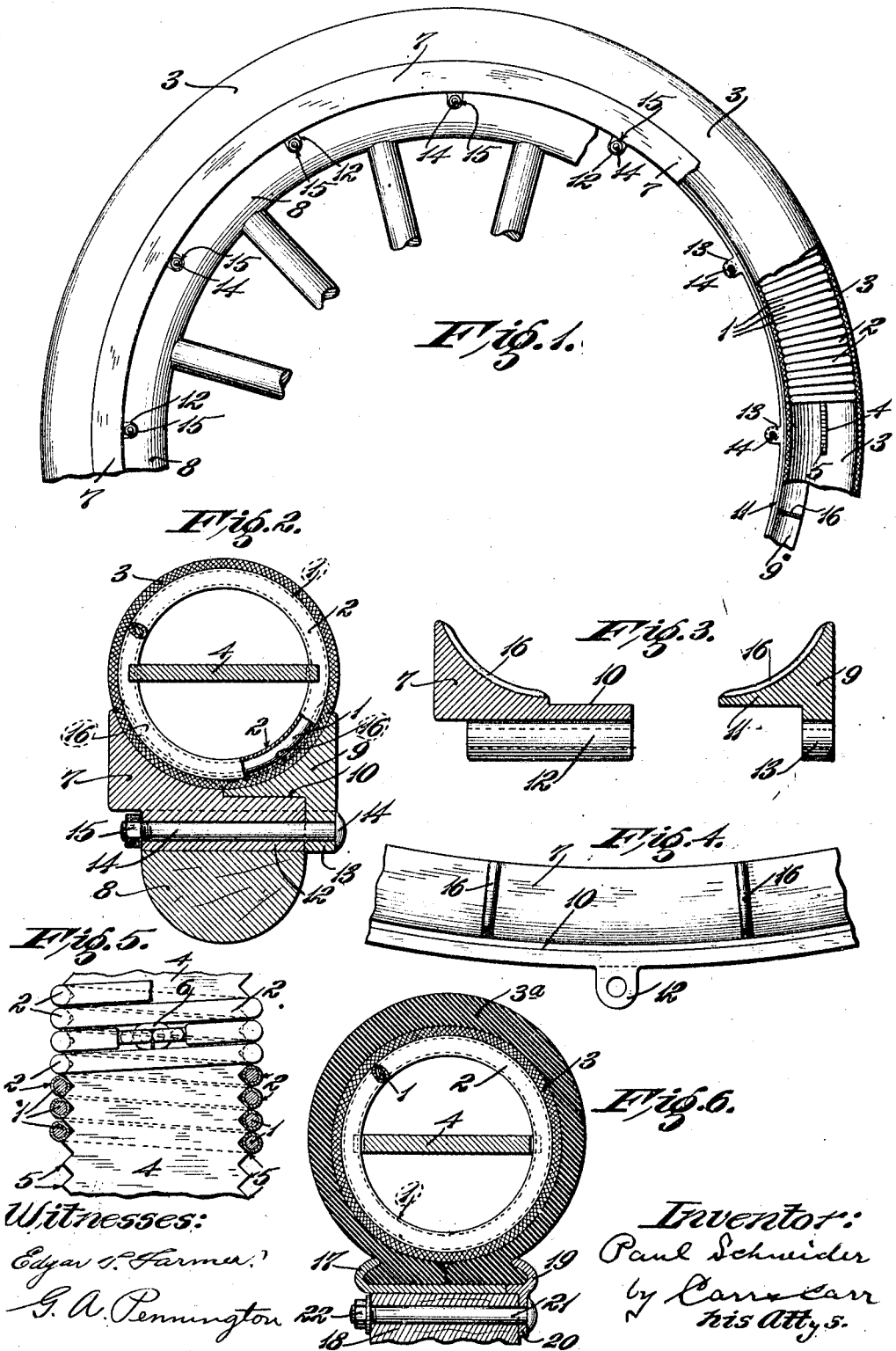

PAUL SCHNEIDER, OF WEBSTER GROVES, MISSOURI.

CUSHION-TIRE.

1,040,431.   Specification of Letters Patent.   Patented Oct. 8, 1912.

Application filed February 12, 1912. Serial No. 677,183.

*To all whom it may concern:*

Be it known that I, PAUL SCHNEIDER, a citizen of the United States, and a resident of the city of Webster Groves, in the county of St. Louis and State of Missouri, have invented a new and useful Improvement in Cushion-Tires, of which the following is a specification.

This invention relates to cushion tires and has for its principal objects to produce light and durable tires having the desired resiliency and obviating certain disadvantages of puncturable pneumatic tires. Other advantages to be obtained will hereinafter more fully appear.

The invention consists in the parts and in the arrangements and combinations of parts hereinafter described and claimed.

In the accompanying drawings which form part of this specification and wherein like symbols refer to like parts wherever they occur,—Figure 1 is a fragmentary view, partly in side elevation and partly in section, of a tire showing an embodiment of the invention; Fig. 2 is a transverse section showing the tire attached to a wheel rim; Fig. 3 is a transverse section of the rim members detached; Fig. 4 is a fragmentary inner face view of one of the rim members; Fig. 5 is a fragmentary view showing the strut member; and Fig. 6 is a transverse section showing the tire used as a core within an ordinary detachable outer casing in lieu of a pneumatic tube.

The tire comprises an endless helical spring 1 whose convolutions are wound close together. The spring wire is wrapped or coated with some treated fabric or other material 2 which is impervious to moisture so as to protect it against corrosion. Around this helical spring is placed a tubular casing 3 which may be composed of rubber and fabric or of any other desirable material, as for example, a suitable hide possessing the requisite durability. Extending around the interior of the helical spring is an endless band or strut 4 of flat metal having suitably notched or serrated edge portions 5 providing seats for the respective convolutions of the spring and preventing undue separation thereof. If desirable, the spring may be wound around the strut member 4 while the latter is straight and the spring and strut member afterward bent together into a ring. The meeting ends of the strut member and spring may be respectively joined in any obvious or desirable manner. As shown in Fig. 5 the ends of the spring are looped and connected by a clip 6.

The tire as shown in Fig. 2 is mounted upon a metal rim comprising a member 7 fixed to the wooden felly 8, and a removable member 9. The fixed member is provided with an annular seat portion 10 (see Fig. 3) and the removable member is provided with a reduced annular portion 11 adapted to fit in said seat portion of the fixed member. The fixed member is provided with a series of lugs 12 having bolt openings therethrough and the removable member is also provided with a series of lugs 13 having similar alined openings. Bolts 14 are inserted through the openings in the lugs 12 and 13 and provided with nuts 15. The rim members 7 and 9 are provided on their inner faces with a series of ribs 16 which take into the casing 3 or indent the latter between the convolutions of the spring 1 when said rim members 7 and 9 are drawn together, whereby the tire is prevented from creeping. Obviously, these ribs 16 may be either directly opposite or staggered as desirable.

In some cases the tire herein described may be used as a core within an ordinary outer casing 3ª in lieu of a pneumatic tube as shown in Fig. 6. In such cases the rim or "clencher" may be of any desirable or well known detachable type. As shown in the drawing it comprises a member 17 fixed on a wooden felly 18 and a detachable member 19 having an annular flange portion 20 which is perforated to receive the securing bolts 21 having nuts 22.

A tire constructed in accordance with the present invention has considerable resiliency and obviates the annoyance usually due to punctures of the casing. The covering of the spring wire prevents corrosion and rust and undue deterioration of the qualities of the spring; and the strut member serves to hold the convolutions of the spring in place, yet permitting the proper compression of the tire when pressure is brought to bear against the tread portion.

Obviously, the tire admits of considerable modification without departing from my invention. Therefore, I do not wish to be limited to the specific construction and arrangement shown.

What I claim is:

1. A cushion tire comprising an outer casing and a core including an endless helical spring and an annular strut member extending around the middle of the spring and having seats in which the respective convolutions of the spring are seated at diametrically opposite sides in a horizontal plane.

2. A cushion tire comprising an endless helical spring and an annular strut member comprising a flat band extending around the interior of said spring, said strut member having serrated marginal portions engaging the respective convolutions of said spring.

Signed at St. Louis, Missouri, this 9th day of February, 1912.

PAUL SCHNEIDER.

Witnesses:
G. A. PENNINGTON,
A. H. CROISSANT.

Copies of this patent may be obtained for five cents each, by addressing the "Commissioner of Patents, Washington, D. C."